United States Patent [19]

Bellavoine

[11] 4,217,476

[45] Aug. 12, 1980

[54] INDIVIDUAL PREPARED MEAL TRAY

[75] Inventor: Robert Bellavoine, Plombieres-les-Bains, France

[73] Assignee: De Pruines ISECO S.A., Plombieres-les-Bains, France

[21] Appl. No.: 867,999

[22] Filed: Jan. 9, 1978

[51] Int. Cl.² ............................................. H05B 9/06
[52] U.S. Cl. .............................. 219/10.55 E; 126/390; 219/10.55 F
[58] Field of Search ................. 219/10.55 E, 10.55 M; 126/390; 206/557, 560, 561, 562, 564; 99/416, 448, 451; 426/107

[56] References Cited

U.S. PATENT DOCUMENTS

| | | | |
|---|---|---|---|
| 3,240,610 | 3/1966 | Cease | 126/390 UX |
| 3,547,661 | 12/1970 | Stevenson | 126/390 UX |
| 3,987,267 | 10/1976 | Moore | 219/10.55 E |
| 4,013,798 | 3/1977 | Goltsos | 219/10.55 E X |
| 4,080,524 | 3/1978 | Greenfield, Jr. et al. | 219/10.55 E |
| 4,115,679 | 9/1978 | Moore | 219/10.55 M |

FOREIGN PATENT DOCUMENTS 2451394  5/1976  Fed. Rep. of Germany .... 219/10.55 E

*Primary Examiner*—Arthur T. Grimley
*Attorney, Agent, or Firm*—Pollock, Vande Sande & Priddy

[57] ABSTRACT

The present invention relates to a tray storing the various constituents of a prepared meal and provided with means for taking them to the desired temperature, said tray comprising inner compartment, preferably made of metal and impervious to an electromagnetic microwave radiation, which is adapted to contain a dish to be reheated and which is provided with an opening in a side wall for the introduction and withdrawal of said dish. The invention is more particularly applicable to the distribution of meals in hospitals.

10 Claims, 3 Drawing Figures

INDIVIDUAL PREPARED MEAL TRAY

BACKGROUND OF THE INVENTION

The present invention relates to a tray carrying the various dishes which make up an individual prepared meal served, for example, to patients in a hospital or to airline passengers, or for any other like application.

SUMMARY OF THE PRIOR ART

In these applications, the meal most often comprises a cooked dish which must be eaten hot. The reheating of this dish is particularly problematic, as this must be able to be effected as required, for each individual tray, while all the trays are already prepared and stored at their place of distribution, the preparation and packing having been carried out at another location (e.g., in the central kitchens of a hospital, far from the wards).

In the prior art, it was usual to remove the cooked dish from the tray and store it in a cupboard or a trolley to heat it to about 80° C. before replacing it on the tray and serving the complete tray to the consumer.

Now, it is advantageous, and in certain cases imperative, particularly in hospitals, for the trays to remain in the state in which they were prepared until they are distributed, in order to avoid errors, transposition of the dishes, etc. which could occur if the cooked dish is completely separated from its tray and replaced thereon after having been reheated.

To solve this problem, the present invention proposes an individual tray for carrying the entire prepared meal, i.e., appetizer cooked dish, dessert, beverage, etc. which may be placed in a storage and heating cupboard where only the cooked dish may be reheated, without reheating the other articles.

SUMMARY OF THE INVENTION

To this end, it is proposed to provide the tray with an inner compartment arranged in the body of the tray and opening on a side wall of said tray, said compartment being adapted to contain one or more dishes to be reheated, so that there is direct access to these dishes through the side opening, even when the trays are superposed, and the dishes may either be removed laterally from the compartment or heated inside the compartment through the opening.

The presence of this lateral compartment makes it possible to store trays in a storage space in a storage and reheating cupboard and to heat the dishes contained in the compartment with the aid of a heating chamber in the cupboard, leaving the dishes inside or in the immediate vicinity of their tray.

In a particular arrangement, the compartment is made of metal and is impervious to microwave radiations which may be directed towards the opening of the compartment to assure the selective reheating of the dishes contained therein; the other dishes carried on the tray are therefore not affected by the heating operation.

Said compartment is preferably housed in the thickness of the tray and it opens out on a side wall.

It preferably projects with respect to said wall so as to be able to be applied, imperviously with respect to the microwaves, against the source of radiation which is to serve exclusively to reheat the dishes in the compartment.

DESCRIPTION OF THE PREFERRED EMBODIMENT

Figure 1:
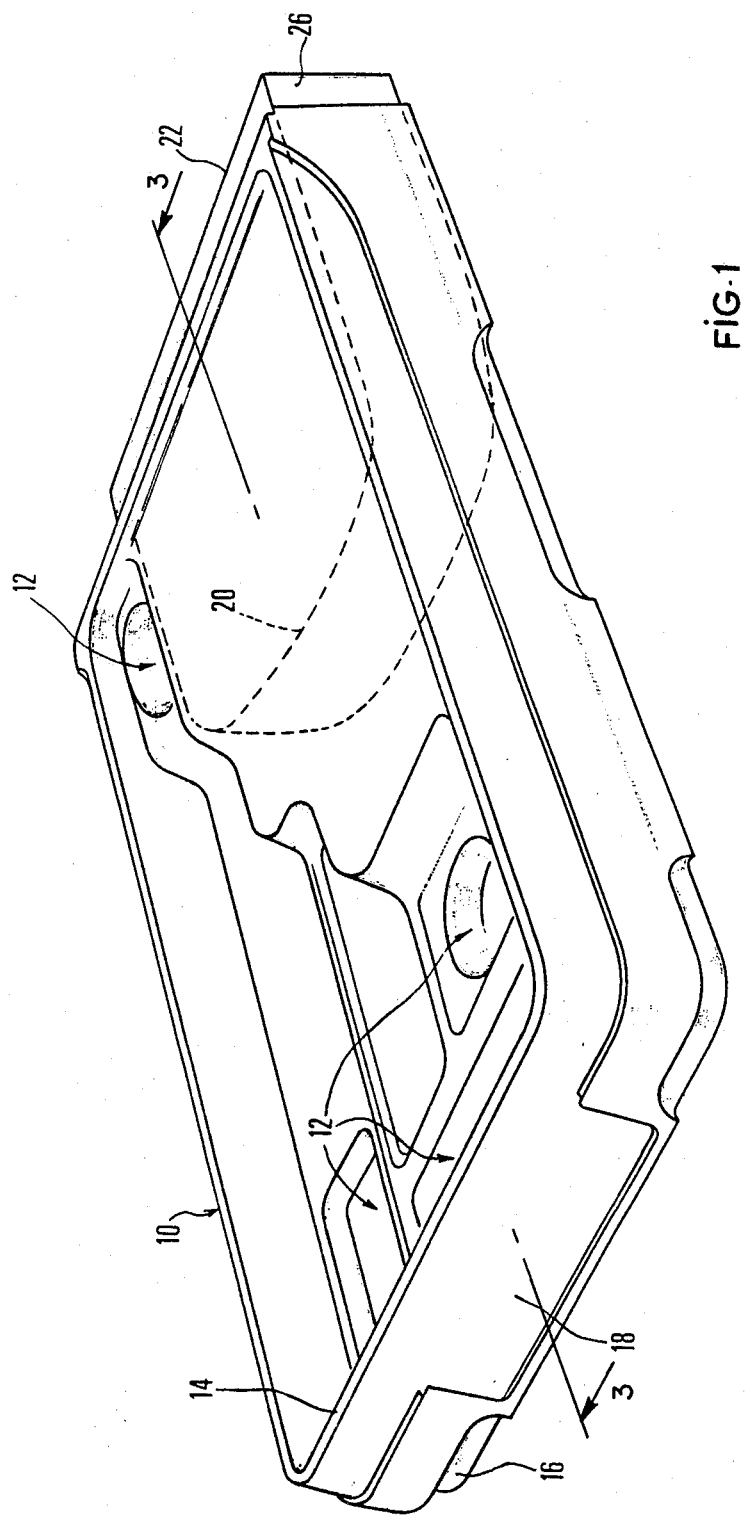
FIG. 1 shows a general view in perspective of the meal tray according to the invention.
Figure 2:
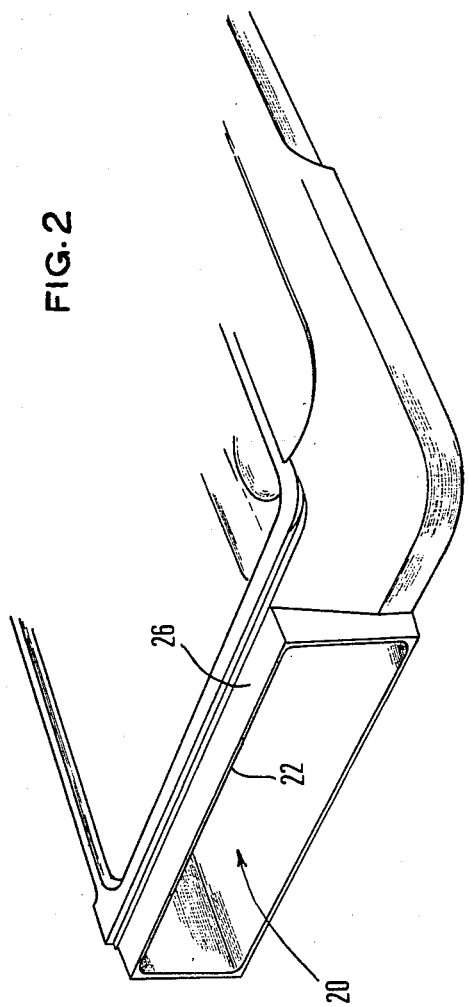
FIG. 2 shows a perspective view of the end of the tray with its metallic compartment.

Referring now to the drawings, the tray according to the invention is generally constituted by a molded plastic envelope 10, made, e.g., of high density polyethylene having a temperature resistance of about −20° to +100° C.

The contour of this envelope is such as to allow accommodation of various accessories necessary for eating the prepared meal on the tray, such as for example, the cutlery, the various hors d'oeuvre dishes, glass, etc. The envelope 10 is constituted so that the trays are stackable even when the prepared meal is placed thereon. To this end, the various recesses 12 provided for the accessories and the dishes are sufficiently deep for the latter not to protrude above the top of the tray.

The outline of the upper edge 14 and of the lower edge 16 of the tray makes it possible to stack the trays in conventional manner.

An area 18 is provided to receive a label or a menu card identifying the prepared tray.

According to the invention, a compartment 20 is provided, housed inside the envelope 10 and completely closed, except at its end 22 which opens out on a side face of the tray.

Figure 3:
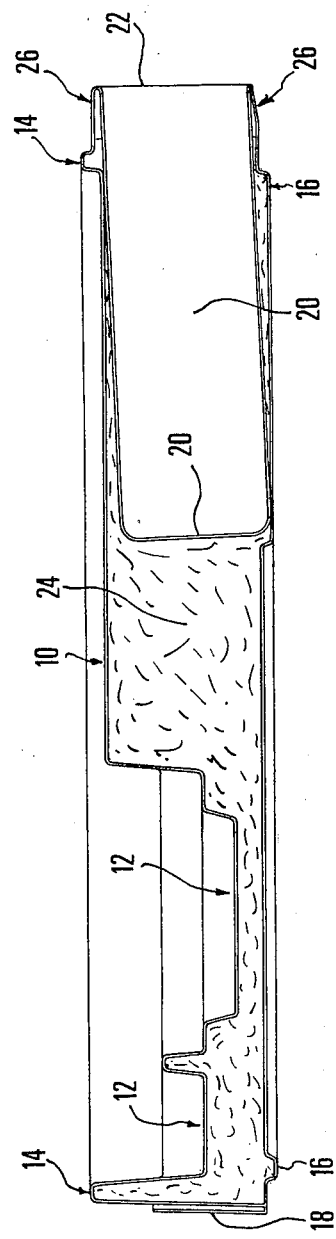
FIG. 3 shows a longitudinal section through the tray along line I—I of FIG. 1.

The compartment 20 is therefore contained in the body of the tray. Its height is sufficient for it to have dimensions allowing the introduction of one or more dishes therein, through its open end 22. As shown in FIG. 3, the compartment occupies almost all the height of the tray inside the plastic envelope 10. It is generally parallelepipedic in form and one of the faces of the parallelepiped constitutes the opening 22.

The compartment 20 is preferably made of metal and is held inside the envelope 10 with the aid of an injection of polystyrene foam 24 inside the envelope 10 and between said envelope and the outer walls of the compartment 20. The polystyrene foam not only assures the rigidity of the whole but also the thermal insulation between the compartment 20 which will contain a hot dish and the rest of the tray which will carry cold dishes. The part of the envelope 10 located above the compartment 20 is flat and may serve to support the different dishes of the meal while they are being eaten, firstly the cold dishes, without being affected by the hot dishes which remain inside the compartment 20, then said hot dishes. If said latter are contained in disposable packings, said packings may be replaced inside the compartment 20 while the hot dish is being eaten, to avoid any hindrance by these packings. If desired, a plate may be placed in the compartment, to be heated and kept hot at the same time as the hot dish.

The tray is preferably stored, firstly to keep cool, then to have the meal carried thereby taken to the desired temperature, in a storage cupboard as described in Applicant's French Patent Application No. 76 26236 of Aug. 31, 1976, entitled "Cupboard for storing prepared meals on individual trays".

In such a cupboard, the trays are stored onto shelves on which they are pushed to a greater or lesser extent, in depending on whether it is desired to keep them cold or to heat them. For cold storage, the tray is pushed not quite to the back of the shelf, so that it leaves clear an opening made in a coolant air circulating shaft, in order to permit this air to be directed to the inside of the compartment 20 to maintain cold the dishes contained therein. The cold air directed towards the compartment may possibly be at a quick-freezing temperature of −20° C.

For reheating purposes, the tray is pushed completely to the back of the shelf, thereby raising a movable flap which, up to that point, isolated a storage space containing the trays from a chamber containing a source of electromagnetic microwave radiation. This raised movable flap places the microwave source in communication with the interior of the compartment containing the dishes to be reheated and said dishes are therefore rapidly taken to a temperature of about 80° C. Movable flaps are located at the level of each tray so that, on lifting a flap, the microwave source is placed in communication only with the compartment of the tray at the level of this flap, but not the others. The selective reheating of the cooked dish of one tray only is therefore possible with the aid of the metallic compartment 20 and its open end 22.

As shown in the drawings, the compartment projects at its end 22 from the tray on the side face thereof. In this way, the end 22 may be brought into contact with the metallic walls of the chamber containing the microwave source in order that the microwave are well directed and confined to the inside of the compartment 20.

More precisely, the projecting part of the compartment 20 at the end 22 is constituted by a metallic band 26 surrounding the whole projecting part and having flat walls, at least one of which will serve to obstruct the openings in the coolant air circulating shafts when the tray is completely inserted on its shelf into the position in which heating takes place. In fact, the circulation of cold air towards the compartment 20 should not be continued while said compartment is being reheated. In practice, the band 26 is constituted by the folded back ends of the walls of the compartment 20 which is substantially parallelepipedic. A rectangular band is thus constituted around the open end 22. Its faces assure both the insulation with respect to microwave and the obstruction of a cold air shaft, when the compartment is in communication with a chamber containing the microwave source.

The metallic compartment is made of any conductive material capable of reflecting the microwave and therefore of preventing them from leaving the compartment. This may be aluminum, Zamak, stainless steel or even galvanized plastic, for example.

What is claimed is:

1. A tray for storing a prepared meal and allowing selective heating of at least one constituent of said meal while avoiding heating of the other constituents of said meal, said tray comprising side walls and a bottom wall made of a nonmetallic material, said bottom wall being provided in a first region with projections and recesses defining compartments for receiving said other constituents of said meal, and in a second region with a metallic compartment housed inside said tray and closed except for an opening accessible from outside said tray, said opening enabling introduction of said constituent to be reheated and enabling communication insulated against electro-magnetic radiation between said compartment and an external source of electromagnetic waves.

2. A tray according to claim 1, wherein said metallic compartment is contiguous to a side wall of said tray and opens in this side wall which is itself provided with a corresponding opening.

3. A tray according to claim 2, wherein said metallic compartment has a substantially parallelopiped shape, one side face of which is open and constitutes said opening of said compartment.

4. A tray according to claim 2, wherein said metallic compartment projects slightly outside the side wall of said tray on which it opens.

5. A tray according to claim 4, wherein the metallic compartment is provided around its opening with a metallic band having at least one flat face adapted to obstruct an opening in a wall of a board against which the tray is placed.

6. A tray according to claim 5, wherein said metallic band is constituted by folded parts of walls of said metallic compartment surrounding the opening of said compartment.

7. A tray according to claim 1, wherein said metallic compartment is embedded in a thermally insulating material.

8. A tray according to claim 7, wherein said insulating material is a mass of polystyrene foam injected in an envelope of molded plastic material forming the bottom and side walls of said tray, said metallic compartment being located inside said envelope.

9. A tray for storing a prepared meal, comprising a bottom wall and side walls, said bottom wall being provided with projections and recesses for receiving constituents of said meal, wherein at least one compartment is provided in a projection of said bottom wall contiguous to a side wall, said compartment having an opening in a side wall of said tray enabling introduction and withdrawal of a dish of said prepared meal.

10. A tray according to claim 9, wherein said compartment is embedded in a thermally insulating material.

* * * * *